April 2, 1957     M. W. SMITH     2,787,755
MAGNETIC FREQUENCY DIVIDER
Filed Aug. 13, 1953
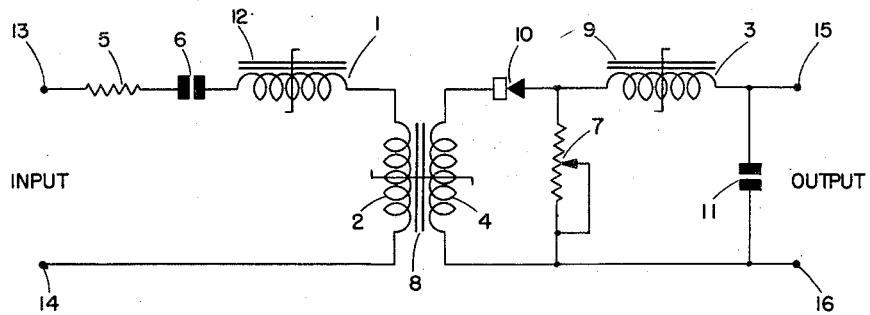
INPUT
OUTPUT
*INVENTOR.*
MILTON W. SMITH
BY
ATTORNEY

2,787,755

MAGNETIC FREQUENCY DIVIDER

Milton W. Smith, Palmdale, Calif., assignor to North American Aviation, Inc.

Application August 13, 1953, Serial No. 373,975

6 Claims. (Cl. 321—68)

This invention pertains to the production of uniformly spaced electrical pulses, and in particular to a magnetic device adapted to produce a relatively low frequency train of electrical pulses from a source of higher frequency electrical pulses.

In control devices of many types the problem often arises of dividing the frequency of an alternating current source to obtain either an alternating current signal of lower frequency or a train of pulses separated by a uniform time interval. To solve this problem it has been proposed to utilize a series of bistable multivibrators, or flip-flops, or to utilize a multivibrator to charge a condenser rapidly in steps. Both of these solutions have the disadvantage that the apparatus required includes vacuum tubes which have a definite short life, and, in addition, these devices require a relatively stable power source to assure accurate operation. This invention contemplates a frequency divider utilizing no vacuum tubes but only static elements such as resistors, condensers, and saturable reactors.

It is therefore an object of this invention to provide an improved frequency divider.

It is another object of this invention to provide a source of uniform interval pulses.

It is another object of this invention to provide a source of constant frequency electrical pulses.

It is another object of this invention to provide means for producing a train of constant frequency pulses of low frequency from a constant frequency, variable-voltage source of higher frequency pulses.

It is another object of this invention to provide a frequency divider whose output is stable despite changes in voltage and frequency of the input thereto.

Other objects of invention will become apparent from the following description taken in connection with the accompanying single figure which is a circuit diagram of the invention.

Referring to the drawing, the device is comprised of saturable reactor windings 1, 2, 3, and 4 wound upon cores 12, 8, and 9, as shown. Input to the device is through resistor 5 and capacitor 6, while the output circuit includes potentiometer 7, rectifier 10, and capacitor 11.

Typically, the input to the device is supplied to terminals 13 and 14 and may consist of 400 cycle alternating current supplied at 115 volts. Output from the device is taken from terminals 15 and 16, and the desired output frequency may be of the order of 50 cycles in frequency. The relatively high frequency input is supplied through resistor 5 and capacitor 6 through saturable reactor winding 1 and saturable transformer winding 2. Saturable reactor winding 1 is arranged to saturate core 12 at a voltage considerably lower than the voltage supplied to it each cycle of the input frequency. Thus, core 12 tends to be saturated and tends to be desaturated twice during each cycle of the supply frequency. The result is that there is supplied to winding 4 a train of pulses of approximately uniform energy level, that is, the product of the voltage appearing across winding 4 and the time duration of the pulse is approximately uniform despite variations in frequency at the input because of the presence of resistor 5, capacitor 6, and reactor winding 1 in the primary circuit of the saturable transformer.

Pulses from winding 4 are applied to saturable reactor winding 3 via potentiometer 7, it being understood that with rectifier 10 in the circuit the pulses applied to winding 3 are unidirectional. Each of these pulses is of amplitude and time insufficient to saturate core 9 upon which winding 3 is wound. If it is desired to accomplish a division ratio of eight, potentiometer 7 should be set so that core 9 becomes saturated only after eight pulses from winding 4. As soon as core 9 saturates, the impedance of winding 3 drops to zero and capacitor 11 becomes charged. As soon as capacitor 11 becomes charged it tends to discharge through potentiometer 7 and saturable reactor winding 3. This discharge current accomplishes complete desaturation of core 9 and supplies an output pulse to terminals 15 and 16 at a frequency which is a submultiple of the frequency supplied to terminals 13 and 14. There thus results an output train of pulses having a repetition rate which is a submultiple of the frequency supplied to terminals 13 and 14. For any given set of circuit parameters the output frequency is a submultiple of the input frequency despite variations in the input frequency and voltage, because of the stabilizing influence of resistor 5, capacitor 6, and reactor winding 1. By adjustment of the value of potentiometer 7 relative to the firing voltage of saturable reactor core 9 it is possible to achieve a division ratio substantially larger than eight, with good accuracy. The size of capacitor 11 must be chosen so that the discharge of this capacitor is always adequate to saturate core 9 in the opposite direction from which it is saturated by the unidirectional current from winding 4.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for generating a constant frequency train of electrical pulses comprising a saturable reactor, means for supplying constant frequency unidirectional electrical pulses to saturate said saturable reactor, which pulses are individually of insufficient energy to saturate said reactor, and a condenser connected to be charged through said saturable reactor only when said saturable reactor is saturated and to desaturate said reactor when said condenser is charged whereby the voltage across said reactor is caused to vary with constant frequency.

2. A device as recited in claim 1 in which said unidirectional pulse supplying means includes in series a tuned circuit and a saturable core transformer connected to said saturable reactor to thereby render the charging and discharging frequency of said condenser insensitive to minor frequency and voltage changes of said input pulses.

3. A frequency divider comprising an input circuit including in series a resistor, a capacitor, a saturable reactor and one winding of a saturable transformer, and an output circuit including a secondary winding on said saturable transformer, a second saturable reactor, means for supplying unidirectional pulses from said secondary winding to said saturable reactor, each said pulse being of insufficient energy to saturate said second saturable reactor, and a capacitor charged by firing of said saturable reactor whereby the charging and discharging frequency of said capacitor is a submultiple of the frequency of input to said input circuit.

4. A device as recited in claim 3 in which said unidirectional pulse means comprises a rectifier in circuit between said second saturable reactor and said transformer secondary, and a resistor connected at one terminal between said rectifier and said second saturable reactor and by the other terminal to the other terminal of said second saturable reactor.

5. A frequency divider comprising a saturable reactor, means for supplying saturating energy to said saturable reactor in predetermined steps, and capacitor means connected to be charged through said saturable reactor when it saturates and of sufficient size to desaturate said saturable reactor whereby the charged-discharge cycle of said capacitor is a submultiple of the frequency of said unidirectional input pulses.

6. A device as recited in claim 5 and further comprising filter means including an additional saturable reactor for assuring that said unidirectional pulses are of substantially the same energy despite changes in voltage and frequency thereof.

References Cited in the file of this patent

UNITED STATES PATENTS

| | | |
|---|---|---|
| 2,419,201 | Crump | Apr. 22, 1947 |
| 2,567,383 | Krabbe | Sept. 11, 1951 |
| 2,682,615 | Sziklai | June 29, 1954 |